United States Patent [19]

Stazo

[11] Patent Number: 4,791,749
[45] Date of Patent: Dec. 20, 1988

[54] FISHING LURE ASSEMBLY

[76] Inventor: Jack Stazo, 10606 N. Evers, Houston, Tex. 77024

[21] Appl. No.: 98,567

[22] Filed: Sep. 21, 1987

[51] Int. Cl.$^4$ .................................. A01K 85/00
[52] U.S. Cl. ................ 43/42.29; 43/42.39; 43/42.24
[58] Field of Search ............ 43/42.1, 42.24, 42.28, 43/42.29, 42.39, 42.41

[56] References Cited

U.S. PATENT DOCUMENTS

| | | | |
|---|---|---|---|
| 3,758,976 | 9/1973 | Szwolkon | 43/42.37 |
| 3,899,847 | 8/1975 | Dworski | 43/42.09 |
| 3,986,291 | 10/1976 | Hopper | 43/42.06 |
| 4,045,903 | 9/1977 | Parker | 43/42.11 |
| 4,054,004 | 10/1977 | Schott | 43/42.09 |
| 4,253,263 | 3/1981 | Franklin et al. | 43/42.24 |
| 4,672,768 | 6/1987 | Pippert | 43/42.09 |

FOREIGN PATENT DOCUMENTS

| | | | |
|---|---|---|---|
| 91744 | 12/1961 | Denmark | 43/42.24 |
| 94933 | 11/1959 | Norway | 43/42.24 |
| 112954 | 5/1968 | Norway | 43/42.24 |

Primary Examiner—Nicholas P. Godici
Assistant Examiner—Richard K. Seidel
Attorney, Agent, or Firm—Kenneth H. Johnson

[57] ABSTRACT

Fishing lures which have a leadhead, soft polymeric body and a fishing hook extended from the body are prepared by using a leadhead with a releasable hooking means for releasably holding a fishing hook, whereby the leadhead and releasable hooking means are positioned into the front of the soft polymeric body and the fishing hook is positioned into the back portion of the body and attached onto the releasable hooking means. Thereby allowing multiple fishing hooks and different placement of fishing hooks than possible with the one piece leadhead and fishing hook arrangement of the prior art.

21 Claims, 2 Drawing Sheets

FISHING LURE ASSEMBLY

BACKGROUND OF THE INVENTION

1. Field of the Invention

The present invention relates to an improvement in fishing lures. In particular, it is an improvement in fishing lures comprised of a soft polymeric body and the combination with a hook/leadhead device.

2. Related Art

Over the years fishermen in their quest for the most realistic lures have adopted a combination lure comprising a jig having a lead weighted head in the general shape of a fish head and a fish hook extending from the rear for use with a variety of soft, flexible bodies called lure bodies here. The lure bodies are generally made of a soft, flexible polymeric resin which can be molded into the shape of any number of desired baits such as minnows, shrimp or worms. An advantage of using the separate jig and lure body is that lure bodies are relatively inexpensive and can be replaced when worn or broken.

In the prior art as shown in FIGS. 1 and 2 the jig, generally indicated at 1 is most often made of two parts a fish hook 2 having an eye 3 at one end of a shank 4 and a barbed hook 5 at the other end, and a weighted leadhead 6 which is usually of lead which is molded about the hook. The hooks are available in a variety of configurations including that shown having a bend as at 7 to place the eye in a position that gives the preferred movement through the water.

Previously the complete lure is assembled by passing the barbed end of the hook into the front end of a lure body and passing the barb and hook through and along the central axis of the lure body until the shank of the jig 8 is pressed into the lure body and the barb is allowed to extend out of the lure body. This assembly is much like baiting a hook with live bait.

U.S. Pat. No. 4,672,768 issued to Pippert adequately describes the prior art and an improvement for the lure body member and is hereby incorporated by reference.

Other varieties of fish hooks are also available such as the double hook shown in FIG. 5. However, the double hook shown there previously could not be used with a lure body because both barbs cannot be simultaneously threaded through the lure body. Likewise other multiple hook arrangements cannot be accommodated for the same reason.

Finally the threading process is rather slow and tedious making the change of lure bodies a slow process. Pippert's improvement consists of pre-formed bores in the lure body to facilitate this process.

The present invention simplifies the changing of lure bodies and at the same time allows for a variety of hook, leadhead and lure body combinations. It is an advantage of the present invention that multiple hooks can be employed with the flexible lure body. It is a further advantage that the hook, whether single or multiple, can be readily and quickly changed or replaced. It is a further advantage that the hook may be positioned further back along the body than can be achieved with a conventional jig.

SUMMARY OF THE INVENTION

The present invention comprises a leadhead having a releasable catch or hook extending from the shank where the fish hook would normally be. Any variety of common fish hooks may be used with any leadhead and lure body. Thus the present invention could be used in combination with the pre-formed bores of Pippert but adds the feature of being adaptable to receive different hook combinations.

DESCRIPTION OF THE PREFERRED EMBODIMENTS

The artificial fishing lure of the present invention may best be described taken in conjunction with the figures in which like components are given like reference numbers.

Figure 1:
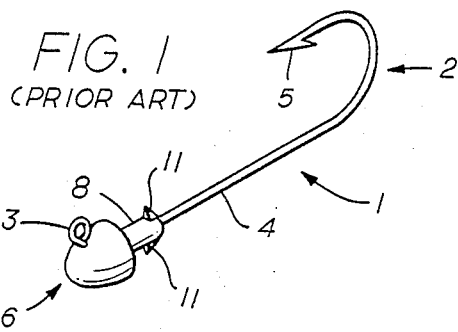
FIG. 1 is an isometric view of the jig of the prior art.
Figure 2:
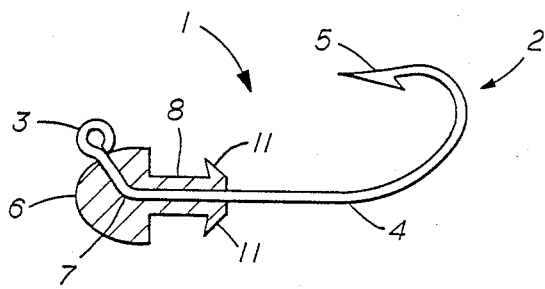
FIG. 2 is a side elevational view of the jig of the prior art.
Figure 3:
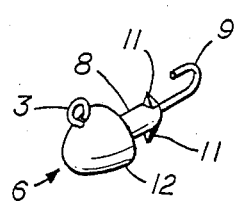
FIG. 3 is an isometric view of the leadhead of the present invention.
Figure 4:
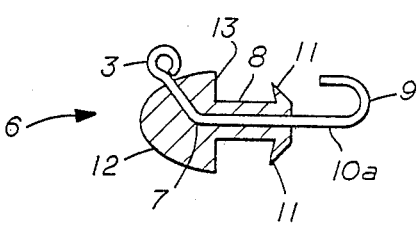
FIG. 4 is a side elevational view of the leadhead of the present invention.

Referring first to FIGS. 3 and 4, a basic embodiment of the invention is shown. A leadhead generally indicated by the numeral 6 has a rounded head 12 having a shank 8 extending from the rear 13. The leadhead and shank are normally of lead and molded about a single piece of wire 10 which has an eye 3 extending from the head a shaft 10a and a hook 9 extending from the rear. In this embodiment the hook 9 is a simple U. The shank may have barbs 11 extending forward toward the head. While the illustration shows a bend 7 in the wire, the wire 10 may be straight depending on the type of action desired. The hook 9 acts as a receptacle for attaching the eye of a fishhook (not shown in FIGS. 3 and 4).

Figure 5:
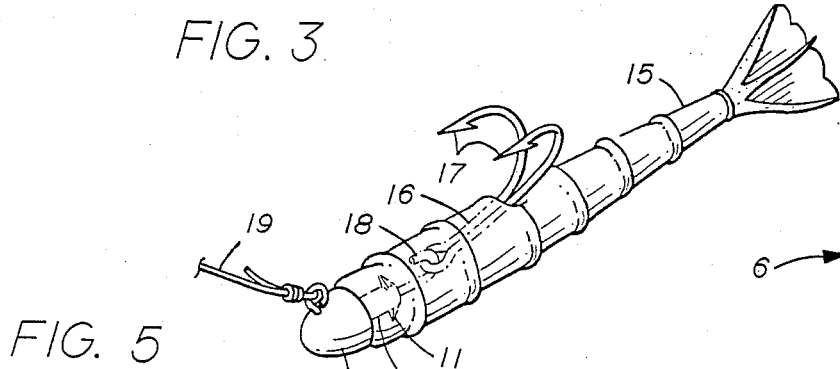
FIG. 5 is an isometric view of the leadhead of the present invention assembled with a tout and multiple hook.
Figure 6:
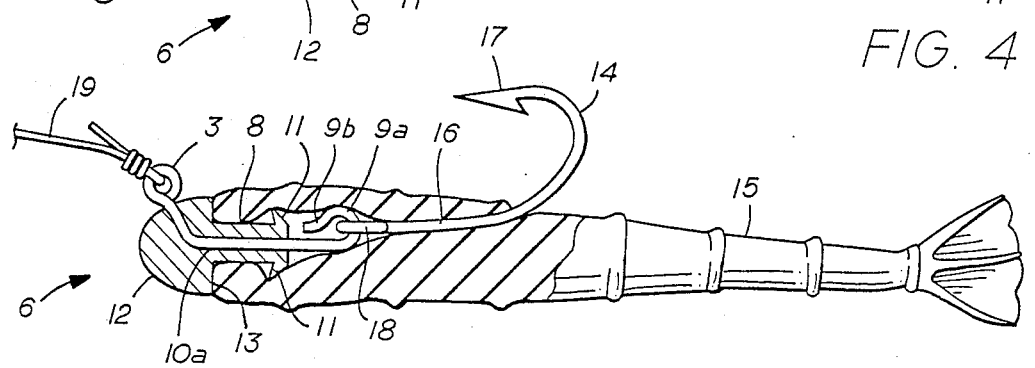
FIG. 6 is a side elevational view of the leadhead of the present assembled with a tout and single hook.
Figure 7:
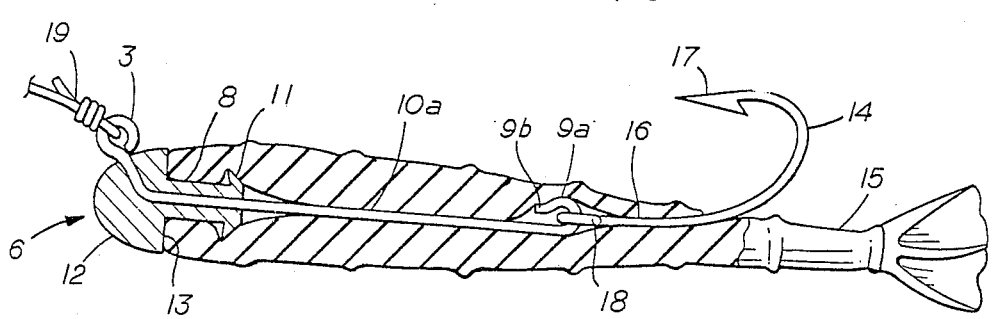
FIG. 7 is another embodiment of the present invention the specialized leadhead of FIG. 14.

Referring now to FIGS. 5 and 6 the use of the leadhead 6 (FIGS. 3 and 5) with a lure body is demonstrated. The lure body, e.g., "tout" is the portion of the fishing lure which corresponds to bait, i.e., that portion on which the fish feed or perceives that it can feed and is the name generally applied to the salt water lure bodies. The touts and other lure bodies used in the present invention are preferably soft, flexible and moderately resilient, such that they are adapted to feel and move like the natural food of the fish. These lure bodies are preferably formed of polymeric materials and are widely used by fisherman, such materials as poly vinylchloride and blends of various polymers, plasticizers, coloring agents and the like are used to obtain life-like shapes, consistencies and movement for the lure body. The shank 8 of the leadhead 6 is pushed into the front of a deformable tout 15. The body of the tout 15 is deformed or pierced by the shank 8, the leadhead being inserted into the tout until the flat rear 13 abuts the front of the tout. The barb(s) 11 act(s) as a restraint to retain the leadhead in place. The eye is positioned at an acute angle "a" from a line through the center front of said head 6. A fish hook 14 is then inserted into the body of the tout using the eye end of the hook 18. The fish hook eye and fish hook shank 16 are pressed into the tout and extended along the central axis of the tout and the fish hook eye is engaged with the hook 9 on the leadhead. The lure body might in the alternative have preformed apertures as described in Pippert. It should be noted that the additional feature of a preformed aperture in the lure body can add substantially to the cost of the lure body, which is by its very nature, the portion of the entire assembly which is destructable and most likely to suffer destruction much like live or dead bait. The present invention is particularly suited to the use of the less expensive unperforated lure bodies. In FIGS. 6 and 7 the hook 9a is a slightly modified hook 9 with the forward end 9b of the hook being depressed toward the wire shaft 10a such that space defined between the end 9a and shaft 10a is preferably just slightly less than the diameter of the fishing hook eye, i.e., a spring clip type engagement. Thus the fishing hook easily snaps on and is not subject to inadvertent disengagement.

It becomes readily apparent that the separate leadhead and fish hook allow for a wider arrangement of hooks than was previously allowed. For example the double hook arrangement shown in FIG. 5 could not previously be used. Double hooks are conventional and are generally two hooks positioned at an acute angle "b" to one another, having shanks which abut in a parallel manner and join at the ends to form the eye. Similarly tandem fish hooks could be accommodated whether they be unitary as the double hook of FIG. 5 or whether fish hooks with different length shafts (not shown are used. Thus it is a particular advantage of the present invention that the hook is seated into the lure body from the rear as opposed to the prior art method of placement being from the front of the lure body.

Figure 8:
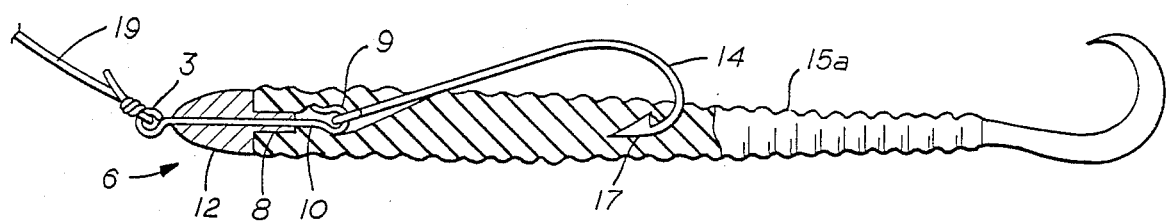
FIG. 8 is a side elevational view of the leadhead of the present invention assembled as an alternative for fresh water use.

In another embodiment as illustrated by FIG. 8, the hook 14 may be inserted with the fish hook barb facing toward the lure body 15. The barb may then be embedded into the lure body to better camouflage the hook. This configuration is also commonly used in fresh water or bottom fishing where debris is likely to be present. This lure body 15a is commonly called a "fresh water worm". Additionally the shank 8 shown in FIG. 8 does not include barbs and the eye 3 extends straight out from the leadhead. This configuration of the eye 3 is preferred when using a "worm" shaped lure body as shown because a more realistic worm movement is achieved when the tout is pulled through the water by the line 19. In the prior art (not shown) fresh water arrangement, the hook 14 may be attached directly to the line 19 (in this case line 19 may be a wire lead) with the head 12 sliding on the line.

Figure 9:
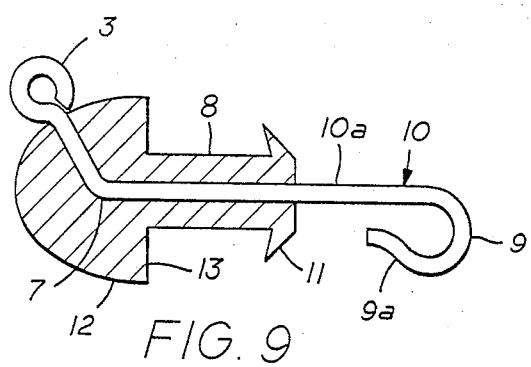
FIG. 9 is a side elevational view of the leadhead of the present invention showing the hook attachment means opposite the eye.

FIG. 9 discloses a leadhead wherein the hook 9 is inverted with respect to the eye 3. This configuration is useful when it is desired to have the hook extend from the underside of the lure body. The different locations of the eye 3 and hook barb 17 results in different movements of the lure body as the entire assembly is pulled through the water.

Figure 10:
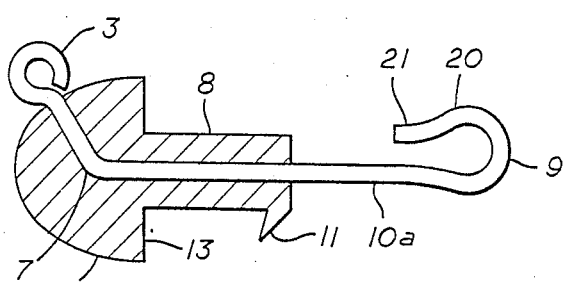
FIG. 10 is a side elevational view of the leadhead of the present invention showing one alternative hook attachment means.

FIG. 10 depicts another embodiment of the fish hook attachment means. Instead of a U-hook the end 9a of the hook 9 is bent toward wire 10a with a portion 21 nearly abutting the wire. The barb 11 is located in the particular location, i.e., on a plane with the eye 3 because in casting this is at the juncture of the two mold halves. Barbs located elsewhere would require more elaborate molds. The barbs serve to hold the leadhead or jig in place in the lure body. In the preferred embodiment shown in FIG. 10, the barb position in front of the fishhook attachment means has been eliminated. This has the advantage that the barb can not inadvertently snag the hook eye 18. In many situations the barb position in front of the attachment means is not a concern, however, for night fishing, having a near foolproof attachment means is a prime consideration. If the hook eye is left on the barb, then both the hook and the lure body may be lost.

Figure 12:
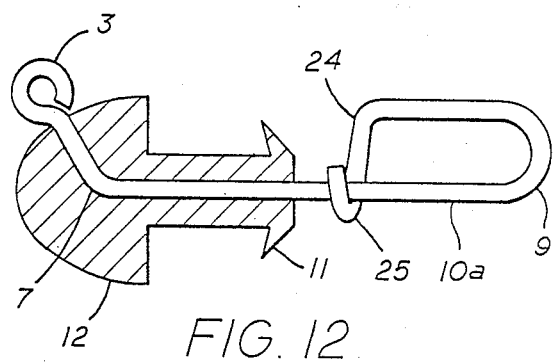
FIG. 12 is a side elevational view showing yet another embodiment of the hook attachment means.
Figure 13:
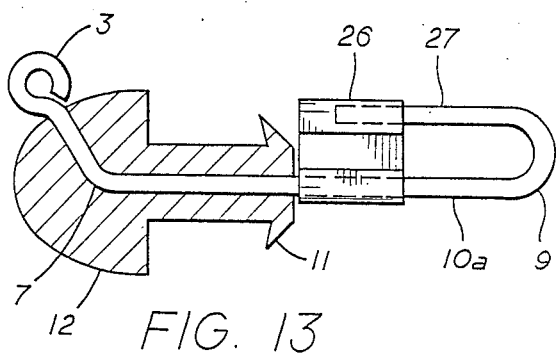
FIG. 13 is a side elevational view of yet another embodiment of the hook attachment means.
Figure 11:
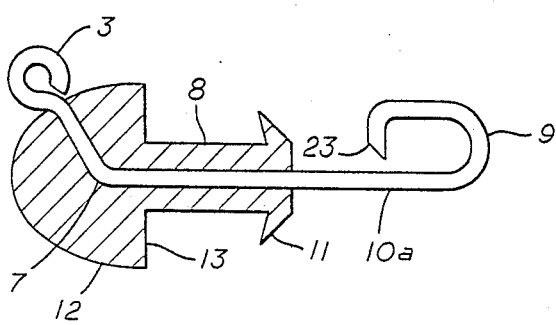
FIG. 11 is a side elevational view showing another embodiment of the hook attachment means.

Further embodiments of the fish hook attachment means are shown in FIGS. 11-14, FIGS. 12 and 13 illustrate specialized versions of spring clips used for attachment of hooks. In FIG. 11 the top arm of the hook 9 is bent at a 90° angle back toward the wire and a bevel 23 provided to ease the insertion of the fish hook eye. More secure attachment means are shown in FIGS. 12 and 13. In FIG. 12 the top arm 24 of the U-hook 9 is bent downward toward the wire shaft 10a and a loop 25 formed in the end to make a releasable clip. Finally FIG. 12 illustrates the use of a simple clip 26 between the wire shaft 10a and arm 27 to close the end of the hook 9.

Figure 14:
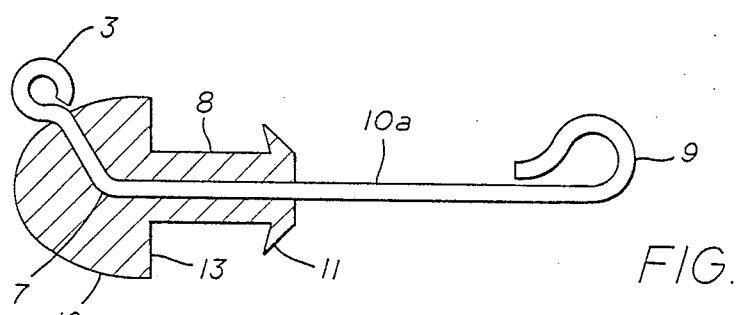
FIG. 14 is a side elevational view of an embodiment of the hook attachment means having an extended shaft.

FIG. 7 shows an embodiment substantially the same as FIG. 6 but employing a leadhead 6 according to the present invention having an extended shank 10a shown in FIG. 14, which places the hook 9 nearer the tail end of the tout. This arrangement is particularly suited for bottom dwelling fish such as flounder.

Many other variations of a releasable fish hook attachment means may be used which would come within the scope of the appended claims. Also different shaped leadheads and lure bodies could be used to simulate any type of bait commonly used by fishermen. Furthermore, any number of hooks and configurations might be used.

The invention claimed is:

1. A leadhead comprising:
   a continuous wire member having an eye at one end thereof and a means for releasable attachment to a fishing hook to the other end thereof and a sold lead body member rigidly affixed to a central portion of said wire member.

2. The leadhead according to claim 1 wherein said body member is generally rounded proximal to said eye and extends along said wire toward said mean for releasable attachment.

3. The leadhead according to claim 1 wherein said eye and said means for releasable attachment are disposed toward each other.

4. The leadhead according to claim 1 wherein said eye and said means for releasable attachment are disposed away from each other.

5. The leadhead according to claim 1 wherein said body is heavier than water.

6. The leadhead according to claim 1 wherein said releasable attachment means comprises an end portion of said wire nearly abutting said wire.

7. A leadhead for use with a fish hook or hooks and lure body comprising:
   (a) a generally rounded forward lead head;
   (b) an eye rigidly attached near the front of said head;
   (c) a hank rigidly attached to and extending from the rear of said head for insertion into said lure body; and
   (d) attachment means for releasably attaching a fish hook or hooks to said leadhead.

8. The leadhead of claim 7 wherein said shank includes at least one barb extending toward said head to aid in securing said head in place in said lure body.

9. The leadhead of claim 7 wherein said attachment means comprises a U-hook extending rearward from said shank.

10. The leadhead of claim 9 wherein said attachment means further comprises a releasable clip extending between the arms of said U-hook.

11. The leadhead of claim 7 wherein said attachment means comprises a spring clip.

12. The leadhead of claim wherein said attachment means comprises a wire extending from said shank and a portion extending forward and nearly abutting said wire.

13. The leadhead of claim 7 wherein said eye and said attachment means are formed from one piece of suitable gauge wire, said eye being set at an acute angle from a line through the front of said head, said angle being selected to provide the desired movement of the tout when pulled through the water.

14. In an artificial fishing lure assembly the combination comprising:
   (a) a soft flexible lure body having a front, a center and a tail;
   (b) a leadhead having a generally rounded forward leadhead, an eye rigidly attached near the front of said head, a shank rigidly attached to and extending from the rear of said head for insertion into said lure body, and attachment means for releasably attaching a fish hook or hooks to said leadhead; and
   (c) at least one fish hook having a fish hook eye and fish hook shank for insertion into said lure body, said fish hook eye being releasably engageable with said attachment means.

15. The fish hook assembly of claim 14 wherein said eye is set at an acute angle from a line through the front of said head, said angle being selected to provide the desired movement of said lure body when pulled through the water.

16. The fishing lure assembly of claim 15 wherein said fish hook or hooks may be attached to said shank such that said fish hook shank is in a plane with said eye whereby said fish hook extends from said lure body opposite from said eye.

17. The fishing lure assembly of claim 14 wherein said fish hook comprises two hooks and barbs set at an acute angle to one another and having fish hook shanks which abut in a parallel manner and join at the ends to form said fish hook eye.

18. The fishing lure assembly of claim 17 wherein said fish hook shanks are of substantially different lengths.

19. The fishing lure assembly of claim 17 wherein said angle is greater than zero and said fish hook shanks are substantially the same length.

20. A leadhead for use with a fish hook or hooks and lure body comprising:
   (a) a generally rounded forward head;
   (b) an eye attached near the front of said head;
   (c) a shank extending from the rear of said head for insertion into said lure body; and
   (d) attachment means for releasably attaching a fish hook or hooks to said leadhead, said attachment comprising a U-hook extending rearward from said shank and a releasably clip extending between the arms.

21. A leadhead for use with a fish hook or hooks and lure body comprising:
   (a) a generally rounded forward head;
   (b) an eye attached near the front of said head;
   (c) a shank extending from the rear of said head for insertion into said lure body; and
   (d) attachment means for releasably attaching a fish hook or hooks to said leadhead, said attachment comprising a spring clip.

* * * * *